United States Patent [19]

Winnik et al.

[11] Patent Number: 5,120,361

[45] Date of Patent: * Jun. 9, 1992

[54] INK COMPOSITIONS

[75] Inventors: Francoise M. Winnik; Anthony R. Davidson, both of Toronto; Marcel P. Breton, Mississauga, all of Canada

[73] Assignee: Xerox Corporation, Stamford, Conn.

[*] Notice: The portion of the term of this patent subsequent to Mar. 24, 2009 has been disclaimed.

[21] Appl. No.: 722,441

[22] Filed: Jun. 27, 1991

[51] Int. Cl.⁵ .......................................... C09D 11/00
[52] U.S. Cl. ...................................................... 106/22
[58] Field of Search ............................. 106/20, 22, 23

[56] References Cited

U.S. PATENT DOCUMENTS

| | | | |
|---|---|---|---|
| 4,623,689 | 11/1986 | Shintani et al. | 524/457 |
| 4,664,708 | 5/1987 | Allen | 106/22 |
| 4,680,332 | 7/1987 | Hair et al. | 524/377 |
| 4,705,567 | 11/1987 | Hair et al. | 106/20 |
| 4,791,165 | 1/1988 | Bearss et al. | 524/516 |

Primary Examiner—William R. Dixon, Jr.
Assistant Examiner—Margaret Einsmann
Attorney, Agent, or Firm—E. O. Palazzo

[57] ABSTRACT

An ink composition comprised of a solution comprised of a dendrimer and a dye or dyes.

14 Claims, No Drawings

INK COMPOSITIONS

BACKGROUND OF THE INVENTION

The present invention is generally directed to ink compositions and more specifically to ink jet ink compositions. More specifically, the present invention in embodiments is directed to ink compositions that are particularly suitable for use in known ink jet print processes, which inks contain a dendrimer, such as those as illustrated in copending patent applications U.S. Ser. No. 560,931, and U.S. Ser. No. 646,904, the disclosures of which are totally incorporated herein by reference. One embodiment of the present invention is directed to an ink composition which comprises an aqueous liquid vehicle, a dye, a glycol, and a dendrimer. The dendrimer can be admixed with the ink components to form the final ink jet composition which in embodiments possesses excellent waterfastness characteristics, such as about 80 to about 95 percent. Examples of ink jet printing processes, including thermal ink jet, are illustrated in U.S. Pat. Nos. 4,601,777; 4,251,824; 4,410,899; 4,412,224 and 4,532,530, the disclosures of which are totally incorporated herein by reference.

Ink jet printing systems generally are of two types, continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or to a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and piezoelectric transducer near the other end to produce pressure pulses. The relatively large size of the transducer prevents close spacing of the nozzles necessary for high resolution printing, and physical limitations of the transducer result in low ink drop velocity. Low drop velocity seriously diminishes tolerances for drop velocity variation and directionality, thus impacting the system's ability to produce high quality copies, and also decreases printing speed. Drop-on-demand systems which use piezoelectric devices to expel the droplets also suffer the disadvantage of a slow printing speed.

One type of drop-on-demand system is known as thermal ink jet or bubble jet, and this sytem apparently enables high velocity droplets and allows for the very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process can be repeated. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system can be initiated with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

In copending patent application U.S. Ser. No. 646,904, the disclosure of which is totally incorporated herein by reference, there is illustrated an ink composition which comprises an aqueous liquid vehicle and colored particles comprised of a dendrimer core colored with a dye or dyes covalently attached thereto. The aforementioned ink usually contains water, and as optional additive components known humectants, and known biocides.

In a patentability search report for copending application U.S. Ser. No. 646,904, the following United States Patents were recited: U.S. Pat. No. 4,705,567 relating, for example, to heterophase ink compositions comprised of water and a dye covalently attached to a polyethylene glycol, or polyethylene imine component, which component is complexed with a heteropolyanion; U.S. Pat. No. 4,623,689 which discloses, for example, an ink for ink jet recording wherein the ink contains a certain aqueous colored polymer, see the Abstract for example; and as collateral interest U.S. Pat. Nos. 4,664,708; 4,680,332 and 4,791,165. The disclosures of the aforementioned patents, and all other patents mentioned herein are totally incorporated herein by reference.

Copending application U.S. Ser. No. 544,564, the disclosure of which is totally incorporated herein by reference, relates, for example, to ink compositions which comprise an aqueous liquid vehicle and colored particles of an average diameter of 100 nanometers or less which comprise micelles of block copolymers of the formula ABA, wherein A represents a hydrophilic segment and B represents a hydrophobic segment, and wherein dye molecules are covalently attached to the micelles. In a specific embodiment of the copending application, the colored particles comprise micelles of block copolymers of the formula ABA having silica precipitated therein and dye molecules covalently attached to the micelles. Another embodiment of the copending application is directed to a printing process which comprises incorporating the ink thereof into an ink jet printing apparatus and causing droplets of the ink to be ejected in an imagewise pattern onto a substrate, thereby generating images on the substrate. Also, in another embodiment of the copending application there is disclosed an ink preparation process which comprises, in the order stated, (1) adding to water a block copolymer of the formula ABA, wherein A represents a hydrophilic segment and B represents a hydrophobic segment, thereby forming a dispersion of micelles of the block copolymer; (2) adding a water-soluble base to the dispersion, thereby bringing the pH of the dispersion to at least 8; (3) adding to the dispersion a solution comprising water and a reactive dye capable of reacting with the block copolymer, thereby forming colored polymeric micelles; and (4) admixing the colored micelles with an aqueous liquid vehicle to form an ink composition.

Heterophase inks containing pigment particles as colorants, however, also exhibit difficulties. For example, the particulate colorant may exhibit a tendency to settle out or separate from the liquid vehicle, particularly when the ink is stored for long periods of time. In addition, inks containing pigment particles as colorants tend to be opaque instead of transparent, which reduces their usefulness for printing images on transparencies for the purpose of overhead projection. Further, inks containing pigment particles as colorants tend to clog the narrow orifices of the printhead resulting in deterioration of the print quality. These and other disadvantages, such as poor resistance to rubbing, by another substrate or by hand are avoided, or minimized with the inks of the present invention.

Although known ink jet compositions are suitable for their intended purposes, there remains a need for ink compositions suitable for use in ink jet printing processes. In addition, a need remains for ink compositions particularly suitable for thermal ink jet printing processes. Further, there is a need for ink compositions that exhibit rapid drying times. There is also a need for ink compositions which when applied on paper in an ink jet printing process generate prints with excellent waterfastness characteristics. More specifically, there is a need for ink compositions with aqueous liquid vehicles and dendrimers that exhibit improved waterfastness compared to aqueous inks without dendrimers. A need also remains for ink compositions exhibiting acceptable lightfastness characteristics when printed on a suitable substrate, such that, for example, there is no more than a 20 percent decrease in optical density of the printed areas after several weeks of exposure to ordinary light in the normal environment intended for the use of the printed material. Further, there is a need for ink compositions that are nontoxic and nonmutagenic. In addition, a need exists for ink compositions for which a wide variety of color choices exists. There is also a need for ink compositions that can be prepared by simple and economical processes. Further, there is a need for ink compositions suitable for printing on plain papers, coated or treated papers, and transparency materials. In addition, there is a need for ink compositions that when printed on substrates exhibit excellent optical density, low feathering, for example there is minimal undesirable bleeding of the ink in areas adjacent to the printed images, and excellent rub resistance, for example after strong hand rubbing for an extended period of time, about up to three minutes in embodiments, the image is not removed or disturbed. There is also a need for ink compositions that when used to print on transparency materials generate images that project their original colors when light is passed through the image. A need also remains for ink compositions with acceptable thermal stability, for example the inks are not substantially adversely effected in the printhead by heat, and storage stability. Further, there is a need for ink compositions suitable for ink jet printing that do not induce clogging of the printhead. A need also remains for ink compositions that when printed on substrates exhibit no undesirable intercolor bleeding between areas of different color.

SUMMARY OF THE INVENTION

It is a feature of the present invention to provide ink compositions with many of the advantages illustrated herein.

It is another feature of the present invention to provide ink compositions with excellent waterfastness characteristics.

It is yet another feature of the present invention to provide ink compositions exhibiting acceptable lightfastness characteristics.

It is still another feature of the present invention to provide ink compositions that are nontoxic and nonmutagenic.

Another feature of the present invention is to provide ink compositions for which a wide variety of color choices exists.

Yet another feature of the present invention is to provide ink compositions that can be prepared by simple and economical processes.

Still another feature of the present invention is to provide ink compositions with a dendrimer.

It is another feature of the present invention to provide ink compositions suitable for printing on plain papers, coated or treated papers, and transparency materials.

It is yet another feature of the present invention to provide ink compositions that, when printed on substrates, exhibit excellent optical density, low feathering, and excellent rub resistance.

Additionally, another feature of the present invention is to provide ink compositions that, when used to print on transparency materials, generate images that project their original colors when light is passed through the image.

Another feature of the present invention is to provide ink compositions with acceptable thermal and storage stability.

Moreover, another feature of the present invention is to provide ink compositions suitable for ink jet printing, which inks do not induce, or minimize clogging of the ink printheads.

Also, another feature of the present invention is to provide ink compositions that, when printed on substrates, exhibit minimal, or no undesirable intercolor bleeding between areas of different colors.

Another feature of the present invention is to provide ink compositions with aqueous liquid vehicles and dendrimers that exhibit improved waterfastness compared to aqueous inks containing no dendrimers.

These and other features of the present invention can be accomplished by the provision of ink jet ink compositions. More specifically, the inks of the present invention are comprised of a solution comprised of a dendrimer and a colored dye, or colored dyes. The aforementioned solution usually contains water, a glycol, and as optional additive components, known humectants and known biocides.

Dendrimers are known, and can be considered radially symmetrical molecules of a starburst topology comprised of an initiator core, such as nitrogen, ethylenediimine, and the like, interior layers attached to the core and comprised of, for example, three or four arms, each arm being composed of repeating units, with the number of repeating units in each arm being considered the generation of the dendrimer, and terminal functional groups functionality, such as, for example, a primary amine attached to the outermost generation, which dendrimers are illustrated, for example, in U.S. Pat. Nos. 4,507,466; 4,631,337; 4,558,120; 4,568,737 and 4,587,329; and in D. A. Tomalia, A. M. Naylor, and W. A. Goddard III, *Angewandte Chemie*, Int. Ed. Engl. 29, 138 (1990), the disclosures of which are totally incorporated herein by reference. The size and shape of the starburst dendrimer molecule and the functional groups present in the dendrimer molecule can be controlled by the choice of the initiator core, the number of generations, and the choice of repeating units employed at each generation. The choice of the dendrimer components can affect the properties of the dendrimers. The initiator core type can affect the dendrimer shape producing, for example, spheroid-shaped dendrimers, cylindrical- or rod-shaped dendrimers, or ellipsoid-shaped dendrimers. Sequential building of generations determines the dimensions of the dendrimers and the nature of its interior. Examples of suitable core materials include ammonia, polyfunctional alcohols, such as pentaerythritol or tris-(hydroxymethyl)ethane, 1,1,1-tris-(4'-hydroxyphenyl)-ethane, polyfunctional amines, such as ethylene diamine, linear polyethyleneimines, and the like. The chemical functionality of the repeating unit in the interior layers can include, for example, amidoamines, such as aminoethyl acetamide, imines, such as diethylene diimine, or ethers like those obtained from materials such as, for example, 3,5-dihydroxyethyl benzyl alcohol. The terminal functionalities include, for example, amino groups, hydroxyl groups, carboxylic acid groups, carboxylates, esters, amides, phosphates, sulfonates, and the like. The synthesis of dendrimers usually occurs by a divergent approach that involves the initial reaction of a monomer with the initiator core, followed by exhaustive reaction of the resulting functional groups with a difunctional compound, such as a diamine, including, for example, ethylene diamine, to afford the next generation of reactive amino groups. Repetition of the two-step procedure leads to subsequent generations. An alternate synthetic route uses a convergent growth synthesis as described in detail in C. J. Hawker and J. M. J. Fréchet, *J. Am. Chem. Soc.*, 112, 7638 (1990), disclosure of which is totally incorporated herein by reference. Examples of dendrimers prepared by the divergent approach include the STARBURST ® available from Polysciences, Inc., in which the terminal functional groups are primary amino groups, and which range in average diameter of from about 10.8 Angstroms (first generation) to about 83.9 Angstroms (8th generation).

The liquid vehicle of the inks of the present invention can be comprised of various known components, such as water, a mixture of water and a miscible organic component, such as a glycol, like ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellosolve, ether derivatives, amino alcohols, ketones; biocides; water miscible materials; mixtures thereof; and the like. When mixtures of water and water miscible organic liquids, such as glycols, are selected as the liquid vehicle, the water to organic ratio may be in any effective range, and typically is from about 100:0 to about 30:70, and preferably from about 97:3 to about 50:50. The nonwater or organic component of the liquid vehicle generally serves as a humectant which has a boiling point higher than that of water (100° C.). The ink liquid vehicle components, that is for example the water and the humectants, generally possess absorption characteristics on paper and evaporation properties allowing for the desired ink jet printing speed when the ink is to be used in an ink jet printing process. With the inks of the present invention in embodiments, the liquid vehicle can be present in an amount of from about 85 to about 99.5 percent by weight, and preferably from about 90 to about 99 percent by weight.

Optional known additives can be present in the inks of the present invention as indicated herein, such as biocides like DOWICIL TM 150, 200, and 75, benzoate salts, sorbate salts, and the like, present in an effective amount of, for example, from about 0.0001 to about 4 percent by weight, and preferably from about 0.01 to about 2.0 percent by weight; humectants such as ethylene glycol, diethylene glycol, N-methylpyrrolidinone, propylene glycol, hydroxyethers, ethers, amides, sulfoxides, ketones, lactones, esters, alcohols, and the like present in an effective amount of, for example, from 0 to about 50 percent by weight, and preferably from about 5 to about 40 percent by weight; pH controlling agents such as acids or bases, phosphate salts, carboxylate salts, sulfite salts, amine salts, and the like; present in an amount of from 0 to about 1 percent by weight and preferably from about 0.01 to about 1 percent by weight; and the like.

EMBODIMENTS OF THE INVENTION

The liquid vehicle of the inks of the present invention may be comprised of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellusolve, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70, and preferably from about 97:3 to about 50:50. The nonwater component of the liquid vehicle generally serves as a humectant which has a boiling point higher than that of water (100° C.). In the inks of the present invention, the liquid vehicle is generally present in an amount of from about 85 to about 99.5 percent by weight, and preferably from about 90 to about 99 percent by weight.

Colorants for the inks of the present invention are known and may comprise water-soluble dyes, alcohol-soluble dyes, and the like. These dyes generally exhibit substantial solubility in water or alcohols but exhibit little or no solubility in organic liquids such as oils. Preferred dyes typically have water solubilities of from 0.1 to about 100 grams of dye per liter of water, and preferably have water solubilities of more than 1 gram of dye per liter of water. The colorant for the inks of the present invention can be a dye or mixture of dyes. The dye or mixture of dyes is present in various effective amounts. Typically, the total amount of dye in the ink compositions of the present invention is from about 0.5 to about 10 percent by weight, and preferably from about 3 to about 7 percent by weight, although the amount can be outside of these ranges.

Examples of suitable dyes include food dyes such as Food Black No. 2, Food Red No. 40, Food Blue No. 1, Food Yellow No. 7, and the like, tetra sulfonic acid salts of phthalocyanine derivatives, including copper phthalocyanine derivatives, tetra sodium salts, tetra ammonium salts, tetra potassium salts, tetra lithium salts, and the like, Bernacid Red 2BMN; Pontamine Brilliant Bond Blue A; BASF X-34; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Direct Brill Pink B Ground Crude, available from Crompton & Knowles; Cartasol Yellow GTF Presscake, available from Sandoz; Carodirect Yellow RL (Direct Yellow 86), available from Caroline Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X-34, available from BASF, Carta Black 2GT, available from Sandoz, Inc.; Nezapon Red 492 (BASF); Orasol Red G (Ciba-Geigy); Direct Brilliant Pink B (Crompton-Knowles); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); the Pro-Jet series of dyes available from ICI, including Pro-Jet Yellow I (Direct Yellow 86), Pro-Jet Magent I (Acid Red 249), Pro-Jet Cyan I (Direct Blue 199), Pro-Jet Black I (Direct Black 168), Pro-Jet Yellow 1-G (Direct Yellow 132); Aminyl Brilliant Red F-B, available from Sumitomo Chemical Company; the Duasyn line of "salt-free" dyes available from Hoechst, such as Duasyn Direct Black HEF-SF (Direct Black 168), Duasyn Direct Yellow 6G-SF VP216 (Direct Yellow 157), Duasyn Acid Yellow XX-SF LP413 (Acid Yellow 23), Duasyn Rhodamine B-SF VP353 (Acid Red 52), Duasyn Direct Turquoise Blue FRL-SF VP368 (Direct Blue 199), Duasyn Acid Blue AE-SF (Acid Blue 9); and the like, as well as mixtures thereof. Typical preferred dyes are, for example, Food Black #2 from Bayer, Direct Black 168 from Hoechst, Basacid X-34 from BASF. Also preferred are Direct Blue 199, Acid Blue 9, Acid Red 249, Direct Black 154, Direct Blue 86, and Acid Yellow 23. The dye or mixture of dyes generally is soluble in the liquid vehicle, and is present in various effective amounts. The total amount of dye in the ink compositions of the present invention is from about 1 to about 10 percent by weight, and preferably from about 3 to about 7 percent by weight in embodiments.

Other additives can also be present in the inks of the present invention as indicated herein. For example, one or more surfactants or wetting or dispersing agents can be added to the ink. These additives may be of the cationic, anionic, amphoteric, or nonionic types. Suitable surfactants and wetting or dispersing agents include Tamol® SN, Tamol® LG, those of the Triton® series available from Rohm and Haas Company, those of the Marasperse® series, those of the Igepal® series available from GAF Company, those of the Tergitol® series, Strodex PK-90, available from GAF, Pluronic F-68, available from BASF, Karasperse TU, available from Marasperse, and other commerically available surfactants. These surfactants and wetting agents are present in any effective amounts, generally from 0 to about 15 percent by weight, and preferably from about 0.01 to about 8 percent by weight.

Polymeric additives or dispersants can also be added to the inks of the present invention to enhance the viscosity of the ink. Examples include water soluble polymers such as gum arabic, polyacrylate salts, polymethacrylate salts, polyvinyl alcohols, hydroxypropylcellulose, hydroxyethylcellulose, polyvinylpyrrolidinone, polyvinylether, starch, polysaccharides, sodium salt of naphthalene sulfonate formaldehyde copolymer, sodium salt of alkylbenzene sulfonate, sodium salt of dialkylsulfosuccinate, sodium salt of lignosulfonate, sodium alkylene oxide copolymer, sodium salt of alkyletherphosphate, and the like. In addition, polymers such as hydroxypropylpolyethyleneimine (HPPEI-200) or other polyethyleneimine derivatives can be added to the ink. Polymeric stabilizers can be present in the ink of the present invention in any effective amounts, typically from 0 to about 10 percent by weight, and preferably from about 0.01 to about 5 percent by weight.

Other optional additives that may be included in the inks of the present invention are as illustrated herein and include humectants such as ethylene glycol, diethyleneglycol, N-methylpyrrolidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight; pH controlling agents such as acids or bases, phosphate salts, carboxylate salts, sulfite salts, amine salts, and the like present in an amount of from 0 to about 5 percent by weight and preferably from about 0.01 to about 2 percent by weight; bases present in an amount of from 0 to about 10 percent by weight and preferably from about 4 to about 8 percent by weight; and the like.

Dendrimer examples are as illustrated herein, and in the copending patent applications, such as STARBURST® preferably of a first or third generation, generally present in an effective amount such as a concentration of from about 0.05 percent by weight to about 10 percent by weight, and preferably from about 1 percent by weight to about 5 percent by weight, and admixed with water, preferably water that has been distilled or deionized, to obtain a clear solution.

The ink compositions of the present invention are generally of a viscosity suitable for use in thermal ink jet printing processes. Typically, the ink viscosity is no more than about 5 centipoise, and preferably is from about 1 to about 2.5 centipoise in embodiments.

Ink compositions of the present invention can be prepared by various suitable processes. Typically, the inks are prepared by simple mixing of the ingredients. One process embodiment entails mixing all of the ink ingredients together and filtering the mixture to obtain an ink. Optionally, the mixture obtained after mixing all the ingredients can be heated to a temperature of from about 40° C. to about 55° C. for a period of from about 2 to about 3 hours, subsequently cooling the mixture to room temperature (typically from about 10° to about 35° C.) and filtering the mixture to obtain an ink. More specifically, the inks of the present invention can be prepared by (1) adding a solution in water of a STARBURST® dendrimer to a magnetically stirred solution in water of a dye or dye mixture, a humectant, and a biocide, this solution being kept at a temperature ranging from 10° to 30° C., and preferably from 20° to 25° C.; (2) stirring the resulting mixture at a temperature ranging from 20° to 25° C. for a period of 2 to 24 hours, and preferably 10 to 15 hours; optionally, the mixture can be heated to a temperature ranging from 30° to 60° C. for a period of time of from 30 minutes to 2 hours; (3) filtering the resulting mixture through a 0.45 micron filter; and (4) adjusting the ink pH, measured with an Omega pH-meter, to a value ranging from 7.5 to 10.5 by dropwise addition of an aqueous solution of an acid, such as for example hydrochloric acid.

The present invention is also directed to a process which comprises incorporating the ink composition as illustrated herein with a dendrimer into an ink jet printing apparatus and causing droplets of the ink composition to be ejected in an imagewise pattern onto a substrate. In a preferred embodiment, the printing apparatus employs a thermal ink jet process. Any suitable substrate can be employed, including plain papers such as Xerox 4024® papers, ruled notebook paper, bond paper, silica coated papers such as Sharp Company silica coated paper, JuJo paper, and the like, transparency materials, fabrics, textile products, plastics, polymeric films, wood and inorganic substrates such as metals, and the like. In an embodiment, the process comprises printing onto a porous or ink absorbent substrate, such as plain paper. Ink compositions of the present invention can also be selected for use in ink jet printing processes such as continuous stream, piezoelectric drop-on-demand, bubble jet or thermal ink jet processes. Generally, the process comprises incorporating an ink of the present invention into an ink jet printing apparatus and causing droplets of the ink to be ejected in an imagewise pattern onto a suitable substrate, thereby generating images on the substrate. Various known ink jet apparatus may be employed to generate images with the ink compositions disclosed herein, such as the Diablo C150 IJ ™ printer, Hewlett Packard Desk Jet ™ printers, or the like. Particularly preferred is a thermal ink jet printing apparatus. The inks of the present invention can be used to form images on a wide variety of substrates, including plain paper as mentioned herein such as Xerox 4024® paper, bond paper such as Gilbert® 25 percent cotton bond paper or Gilbert® 100 percent cotton bond paper, silica coated papers, transparency materials, fabrics, plastics, polymeric films, and the like.

Specific embodiments of the invention will now be described in detail. These Examples are intended to be illustrative, and the invention is not limited to the materials, conditions, or process parameters set forth in these embodiments. All parts and percentages are by weight unless otherwise indicated. Comparative data is also presented.

EXAMPLE I

There was prepared an ink from a first generation dendrimer as follows: to 3.174 grams of a 1 percent by weight aqueous solution of first generation STARBURST® Dendrimer (obtained from Polysciences) were added 0.16 gram of tris-(hydroxymethyl)-aminomethane, 0.046 gram of Duasyn Direct Black HEF-SF VP332 ™ (Direct Black 168) (obtained from Hoechst), 0.1607 gram of Bayscript Black CA51071 (Food Black #2) (obtained from Bayer) and 0.44 gram of ethylene glycol (obtained from Fluka). The mixture was stirred overnight at room temperature. It was then filtered through a 0.45 micron filter and brought to a pH of 7.75 by addition of a drop of hydrochloric acid. There resulted a black ink comprised of 5 percent by weight of black dye mixture, 84 percent by weight of water, and 11 percent by weight of diethylene glycol. The black ink thus prepared was incorporated in a Desk Jet ™ Hewlett Packard ink jet printer. Prints were formed on plain papers (Xerox 4024® #16) obtained from Xerox Corporation and on Sanyo L paper obtained from Fuji Xerox. In each instance the black prints obtained exhibited solid areas of acceptable optical density as measured with a Macbeth TR927 Optical Densitometer (1.43 on Xerox 4024® #16 paper/wire side). Feathering, the bleeding of ink from printed areas to nonprinted areas, or the sharpness of the edges of solid printed areas as observed by visual inspection with the aid of an optical microscope was minimal on both the felt side and the wire side of the uncoated paper. In addition, the prints on the Xerox 4024® #16 paper exhibited a waterfastness of 69.0 percent as determined by cutting a printed solid area on Xerox 4024® paper (wire side) into two sheets, soaking one sheet in water for 2 minutes, air drying the soaked sheets for 24 hours at ambient temperature, and measuring the optical densities of both the soaked and unsoaked sheets. The optical density of the sheet that was not soaked in water was 1.33 and the optical density of the sheet soaked in water was 0.94. The waterfastness of prints obtained under the same conditions with a control ink identical to the ink described in this Example but without added dendrimer had a waterfastness of 42.1 on the Xerox 4024® #16 paper.

EXAMPLE II

There was prepared a control ink as follows: to 73.45 grams of deionized water were added 20 grams of ethylene glycol (obtained from Fluka), 3.5 grams of isopropanol (obtained from Caledon Laboratories), 3.0 grams of Direct Black 168 (obtained from Sumitomo) and 0.05 gram of Dowicil 200 TM (obtained from Chemroy Chemicals). The mixture was stirred magnetically at 50° C. for a period of two hours. It was cooled to room temperature and filtered with a 0.45 micron filter. The pH of the filtered ink was adjusted to about 9.0 using a dilute hydrochloric acid solution. The viscosity of this ink was 1.97 centipoise as measured with a Digital Viscometer LVTD (Brookfield Engineering Laboratories, Stoughton, USA). The surface tension of the ink was 47.8 dynes/centimeter as measured with a Digital Tensiometer K 10T (Krüss GmbH, Hamburg, FRG). The composition of this ink was substantially identical to that of the ink described in Example III, except that it did not contain a dendrimer. The physical characteristics of this ink were substantially identical to those of the ink described in Example III with respect to viscosity and surface tension values, however, the waterfastness value is believed to be lower as illustrated herein in embodiments.

EXAMPLE III

There was prepared an ink as follows: to 68.45 grams of deionized water were added 5 grams of a 10 percent by weight solution of first generation STARBURST ® Dendrimer (obtained fron Polysciences), 20 grams of ethylene glycol (obtained from Fluka), 3.5 grams of isopropanol (obtained from Caledon Laboratories), 3.0 grams of Direct Black 168 (obtained from Sumitomo) and 0.05 gram of Dowicil 200 TM (obtained from Chemroy Chemicals). The mixture was stirred magnetically at 50° C. for a period of two hours. It was cooled to room temperature and filtered with a 0.45 micron filter. The pH of the filtered ink was adjusted to about 9.08 using a dilute hydrochloric acid solution. The viscosity of this ink was 4.41 centipoise as measured with a Digital Viscometer LVTD (Brookfield Engineering Laboratories, Stoughton, USA). The surface tension of the ink was 48.0 dynes/centimeter as measured with a Digital Tensiometer K10T (Krüss GmbH, Hamburg, FRG).

EXAMPLE IV

There was prepared a control ink as follows: to 68.45 grams of deionized water were added 20 grams of ethylene glycol (obtained from Fluka), 11.5 grams of Basacid Black X-34 (obtained from BASF as a 30 percent solution in water), and 0.05 gram of polyethylene oxide of molecular weight 18,500 (available from Polysciences). The mixture was stirred at 50° C. for a period of two hours. It was cooled at room temperature and filtered with a 0.45 micron filter. The pH of the filtered ink was adjusted to about 9.0 using a dilute hydrochloric acid solution. The viscosity and surface tension of this ink were 1.78 centipoise as measured with a Digital Viscometer LVTD (Brookfield Engineering Laboratories, Stoughton, USA) and 54.6 dynes/centimeter, as measured with a Digital Tensiometer K10T (Krüss GmbH, Hamburg, FRG), respectively. The composition of this ink was substantially identical to that of the inks described in Examples V, VI, and VII, except that it did not contain a dendrimer. The physical characteristics of this ink were substantially identical to those of the ink described in Examples V, VI, and VII with respect to viscosity and surface tension values.

EXAMPLE V

There was prepared an ink as follows: to 62.95 grams of deionized water were added 20 grams of ethylene glycol (obtained from Fluka), 11.5 grams of Basacid Black X-34 (obtained from BASF as a 30 percent solution in water), 0.05 gram of polyethylene oxide of molecular weight 18,500 (available from Polysciences) and 0.5 gram of a 10 percent by weight solution in water of first generation STARBURST ® dendrimer. The mixture was stirred at 50° C. for a period of two hours. It was cooled at room temperature and filtered with a 0.45 micron filter. The pH of the filtered ink was adjusted to about 9.0 using a dilute hydrochloric acid solution. The viscosity and surface tension of this ink were 1.72 centipoise as measured with a Digital Viscometer LVTD (Brookfield Engineering Laboratories, Stoughton, USA) and 54.3 dynes/centimeter as measured with a Digital Tensiometer K10T (Krüss GmbH, Hamburg, FRG), respectively.

EXAMPLE VI

There was prepared an ink as follows: to 62.95 grams of deionized water were added 20 grams of ethylene glycol (obtained from Fluka), 11.5 grams of Basacid Black X-34 (obtained from BASF as a 30 percent solution in water), 0.05 gram of polyethylene oxide of molecular weight 18,500 (available from Polysciences) and 0.5 gram of a 10 percent by weight solution in water of second generation STARBURST ® dendrimer (obtained from Polysciences). The mixture was stirred at 50° C. for a period of two hours. It was cooled at room temperature and filtered with a 0.45 micron filter. The pH of the filtered ink was adjusted to about 9.0 using a dilute hydrochloric acid solution. The viscosity and surface tension of this ink were 1.73 centipoise as measured with a Digital Viscometer LVTD (Brookfield Engineering Laboratories, Stoughton, USA) and 54.4 dynes/centimeter as measured with a Digital Tensiometer K10T (Krüss GmbH, Hamburg, FRG), respectively.

EXAMPLE VII

There was prepared an ink as follows: to 62.95 grams of deionized water were added 20 grams of ethylene glycol (obtained from Fluka), 11.5 grams of Basacid Black X-34 (obtained from BASF as a 30 percent solution in water), 0.05 gram of polyethylene oxide of molecular weight 18,500 (available from Polysciences) and 0.5 gram of a 10 percent by weight solution in water of third generation STARBURST ® dendrimer (obtained from Polysciences). The mixture was stirred at 50° C. for a period of two hours. It was cooled at room temperature and filtered with a 0.45 micron filter. The pH of the filtered ink was adjusted to about 9.0 using a dilute hydrochloric acid solution. The viscosity and surface tension of this ink were 1.71 centipoise as measured with a Digital Viscometer LVTD (Brookfield Engineering Laboratories, Stoughton, USA), and 53.8 dynes/centimeter as measured with a Digital Tensiometer K10T (Krüss GmbH, Hamburg, FRG), respectively.

WATERFASTNESS OF PRINTS MADE WITH THE INKS DESCRIBED IN EXAMPLES II TO VII

The inks prepared as described in Examples II to VII were printed using a Hewlett Packard Deskjet printer on Rolland paper, Hammermill Fore DP (20 lb) paper and on Apple Classic Crest (24 lb), identified as papers #1, #2 and #3, respectively, in the Table. The waterfastness of each print was determined 24 hours after printing by the procedure described in Example I. The waterfastness data are provided in the Table, and demonstrate that STARBURST ® dendrimers can be used to improve print waterfastness.

OPTICAL DENSITY AND WATERFASTNESS DATA FOR INKS CONTAINING STARBURST ® DENDRIMERS

| Ink Sample | Paper Type[1] (felt side) | O.D.[2] | Percent Waterfastness |
| --- | --- | --- | --- |
| Example II (control) | #1 | 1.17 | 53.0 |
| | #2 | 1.11 | 79.3 |
| | #3 | 1.27 | 44.1 |
| Example III | #1 | 1.14 | 82.2 |
| | #2 | 0.98 | 87.8 |
| | #3 | 1.23 | 84.6 |
| Example IV (control) | #2 | 1.20 | 76.7 |
| | #3 | 1.35 | 52.6 |
| Example V | #2 | 0.95 | 74.7 |
| | #3 | 1.23 | 65.0 |
| Example VI | #2 | 1.21 | 68.6 |
| | #3 | 1.34 | 70.9 |
| Example VII | #2 | 1.20 | 74.2 |
| | #3 | 1.36 | 64.7 |

[1]Rolland - #1
Hammermill Fore DP (20 lb.) - #2
Apple Classic Crest (24 lb) - #3
[2]Optical Density before soaking.

EXAMPLE VIII

There is prepared a yellow ink as follows: to 71.45 grams of deionized water is added 20 grams of ethylene glycol (obtained from Fluka), 3 grams of Duasyn Acid Yellow XX-SF (obtained from Hoechst), 0.05 gram of polyethylene oxide of molecular weight 18,500 (available from Polysciences) and 0.5 gram of a 10 percent by weight solution in water of first generation STARBURST ® dendrimer (obtained from Polysciences). The mixture is stirred at 50° C. for a period of two hours. It is then cooled at room temperature and filtered with a 0.45 micron filter. The pH of the filtered ink is adjusted to about 9.0 using a dilute hydrochloric acid solution. The viscosity and surface tension of this ink are 1.71 centipoise and 53.8 dynes/centimeter, respectively. When printed on Xerox Corporation 4024 ® paper, this ink will exhibit, it is believed, superior waterfastness, as compared to prints made with a yellow ink of identical composition but without added STARBURST ® dendrimers.

EXAMPLE IX

There is prepared a magenta ink as follows: to 71.45 grams of deionized water are added 20 grams of ethylene glycol (obtained from Fluka), 3 grams of Duasyn Brilliant Red F3B-SF VP218 (obtained from Hoechst), 0.05 gram of polyethylene oxide of molecular weight 18,500 (available from Polysciences) and 0.5 gram of a 10 percent by weight solution in water of first generation STARBURST ® dendrimer (obtained from Polysciences). The mixture is stirred at 50° C. for a period of two hours. The aforementioned mixture is cooled at room temperature and filtered with a 0.45 micron filter. The pH of the filtered ink is adjusted to about 9.0 using a dilute hydrochloric acid solution. The viscosity and surface tension of this ink are 1.74 centipoise and 54.2 dynes/centimeter, respectively. When prints with Xerox Corporation 4024 ® are formulated, this ink, it is believed, will exhibit superior waterfastness as compared to prints made with a magenta ink of identical composition but without added STARBURST ® dendrimers.

EXAMPLE X

There is prepared a cyan ink as follows: to 71.45 grams of deionized water are added 20 grams of ethylene glycol (obtained from Fluka), 3 grams of Duasyn Acid Blue AE-SF VP344 TM (obtained from Hoechst), 0.05 gram of polyethylene oxide of molecular weight 18,500 (available from Polysciences) and 0.5 gram of a 10 percent by weight solution in water of first generation STARBURST ® dendrimer (obtained from Polysciences). The mixture is stirred at 50° C. for a period of two hours. It was cooled at room temperature and filtered with a 0.45 micron filter. The pH of the filtered ink is adjusted to about 9.0 using a dilute hydrochloric acid solution. The viscosity and surface tension of this ink are 1.74 centipoise and 54.2 dynes/centimeter, respectively. When printed on Xerox Corporation 4024 ® paper, this ink is believed to exhibit superior waterfastness as compared to prints made with a cyan ink of identical composition but without added STARBURST ® dendrimers.

Other embodiments and modifications of the present invention may occur to those skilled in the art subsequent to a review of the present application; these embodiments and modifications, as well as equivalents thereof, are also included within the scope of this invention.

What is claimed is:

1. An aqueous ink composition comprised of a solution comprised of a dendrimer and a dye or dyes.

2. An ink in accordance with claim 1 wherein the solution contains water, a humectant, and a biocide.

3. An ink in accordance with claim 1 wherein the dendrimer is a first, second or third generation dendrimer.

4. An ink in accordance with claim 1 wherein the dendrimer is a dendrimer of the first generation with an average diameter of about 10.8 Angstroms, and with 6 terminal amino groups.

5. An ink in accordance with claim 1 wherein the dendrimer is of the third generation with an average diameter of about 22 Angstroms, and with 24 terminal amino groups.

6. An ink in accordance with claim 1 wherein the dye or dyes are selected from the classes of food dyes, direct dyes, or acid dyes.

7. An ink in accordance with claim 1 wherein the dye is selected from the group consisting of anthraquinones, monoazo dyes, disazo dyes, phthalocyanines, aza annulenes, formazan copper complexes, and triphenodioxazines.

8. An ink in accordance with claim 6 wherein the dye is a Direct Black 168 TM.

9. An ink in accordance with claim 1 wherein the dye is present in an amount of about 0.5 to about 10 percent by weight, the dendrimer is present in an amount of about 1 to about 15 percent by weight, and the solution contains water in an amount of from about 75 to about 98.5 percent by weight.

10. An ink in accordance with claim 1 wherein the dye is present in an amount of about 2 to about 7 percent by weight, the dendrimer is present in an amount of from about 0.01 to about 2 percent by weight, and the solution contains water in an amount of from about 96 to about 80 percent by weight.

11. An ink in accordance with claim 4 wherein the humectant is present in the amount of from about 2 to about 50 percent by weight.

12. An ink in accordance with claim 4 wherein the humectant is a glycol.

13. An ink in accordance with claim 12 wherein the glycol is selected from the group consisting of ethylene glycol, propylene glycol, diethylene glycol, and mixtures thereof.

14. An ink in accordance with claim 4 wherein the biocide is present in the amount of from about 0.02 to about 0.1 percent by weight.

* * * * *